US009819558B2

(12) United States Patent
Vojnovic et al.

(10) Patent No.: US 9,819,558 B2
(45) Date of Patent: Nov. 14, 2017

(54) STREAMING QUERY RESOURCE CONTROL (71) Applicant: Microsoft Technology Licensing, LLC, Redmond, WA (US)

(72) Inventors: Milan Vojnovic, Cambridge (GB); Christos Gkantsidis, Ely (GB); Bo Zong, Goleta, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 513 days.

(21) Appl. No.: 14/194,963

(22) Filed: Mar. 3, 2014

(65) Prior Publication Data
US 2015/0249583 A1 Sep. 3, 2015

(51) Int. Cl.
*G06F 15/16* (2006.01)
*H04L 12/26* (2006.01)
(Continued)

(52) U.S. Cl.
CPC ...... *H04L 43/062* (2013.01); *G06F 17/30899* (2013.01); *H04L 47/125* (2013.01);
(Continued)

(58) Field of Classification Search
CPC .. G06F 9/542; G06F 2209/549; G06F 9/4843; G06F 9/4881; G06F 15/161;
(Continued)

(56) References Cited

U.S. PATENT DOCUMENTS 6,463,454 B1 * 10/2002 Lumelsky ............. G06F 9/5083
707/E17.12
7,299,291 B1 * 11/2007 Shaw .................. H04L 65/4069
709/203
(Continued)

FOREIGN PATENT DOCUMENTS

WO           9940514 A1       8/1999

OTHER PUBLICATIONS

Ahmad et al (Non-Patent Literature Titled "Network-Aware Query Processing for Stream-based Applications", Proceedings of 30th VLDB Conference, Toronto, Cananda, 2004 pp. 456-467 (12 pages).*
(Continued)

*Primary Examiner* — Kevin Bates
*Assistant Examiner* — Ranjan Pant (57) ABSTRACT Streaming query resource control is described, for example, to allocate streaming queries to servers in a data center providing a streaming query platform. In various embodiments streaming queries are allocated to servers in a manner seeking to balance load between the servers and also to reduce network traffic costs between data stream sources and the servers. In various examples, query types are taken into account, where a query type is the identity of one or more data stream sources used by the query, and optionally also traffic rates of the data stream sources. In some examples, processes for allocating incoming queries in an online fashion are described and in some examples, processes for allocating queries in an offline fashion are described. In examples, a network traffic cost metric is used which takes into account an incremental network traffic cost of adding a given query at a server.

20 Claims, 9 Drawing Sheets (51) Int. Cl.
*H04L 12/803* (2013.01)
*H04L 12/911* (2013.01)
*H04L 29/08* (2006.01)
*G06F 17/30* (2006.01)

(52) U.S. Cl.
CPC ............ *H04L 47/70* (2013.01); *H04L 67/101* (2013.01); *H04L 67/1008* (2013.01); *H04L 67/1023* (2013.01); *H04L 67/1031* (2013.01)

(58) Field of Classification Search
CPC ......... G06F 17/30867; G06F 17/30598; G06F 3/067; G06F 17/30203; G06F 17/30067; G06F 17/3019; G06F 9/505; H04L 67/42; H04L 12/1895; H04L 67/1002; H04L 69/329; H04L 12/581; H04L 63/102; H04L 43/028; H04L 67/16; H04L 43/062; H04L 47/125; H04L 47/70; H04L 67/1008; H04L 67/101; H04L 67/1031; H04L 67/1097; H04L 67/288; H04L 45/00; H04L 43/10; H04L 63/10; H04L 67/1074; H04L 67/1017; H04L 67/1023; H04L 41/12; H04L 47/726; H04L 67/327; H04L 12/1822; H04L 29/06; H04L 29/08072; H04L 29/0809; H04L 67/1014; H04L 67/02; H04L 67/10; H04L 45/20; H04L 45/12; H04L 45/22; H04L 67/1012; H04L 67/1019; H04L 67/1029; H04L 67/1038; H04L 45/42; H04L 12/1489; H04L 41/5009; H04L 43/04; H04L 67/1027; H04W 28/08; G06Q 10/06; G06Q 10/063

See application file for complete search history.

(56) References Cited

U.S. PATENT DOCUMENTS

| | | | | |
|---|---|---|---|---|
| 7,383,253 | B1* | 6/2008 | Tsimelzon | G06F 17/30516 707/610 |
| 8,060,614 | B2* | 11/2011 | Goldstein | G06F 9/5083 709/226 |
| 8,234,296 | B1* | 7/2012 | Black | G06F 17/30516 707/769 |
| 2001/0052016 | A1* | 12/2001 | Skene | G06F 9/505 709/226 |
| 2001/0056500 | A1* | 12/2001 | Farber | G06F 9/505 709/245 |
| 2003/0179707 | A1* | 9/2003 | Bare | H04L 12/185 370/235 |
| 2004/0083277 | A1* | 4/2004 | Chaporkar | H04L 41/145 709/220 |
| 2007/0100960 | A1* | 5/2007 | Eichstaedt | G06F 17/30902 709/217 |
| 2007/0214458 | A1 | 9/2007 | Bansal et al. | |
| 2008/0195755 | A1* | 8/2008 | Lu | H04L 29/06 709/241 |
| 2009/0319687 | A1* | 12/2009 | Goldstein | G06F 9/5083 709/241 |
| 2010/0242042 | A1 | 9/2010 | Bansal et al. | |
| 2011/0138064 | A1 | 6/2011 | Rieger et al. | |
| 2011/0145828 | A1* | 6/2011 | Takahashi | H04L 67/1029 718/102 |
| 2011/0246999 | A1* | 10/2011 | Bansal | G06F 9/50 718/103 |
| 2012/0198074 | A1* | 8/2012 | Liaw | H04L 67/1002 709/226 |
| 2012/0226797 | A1* | 9/2012 | Ghosh | H04L 51/043 709/224 |
| 2013/0054809 | A1* | 2/2013 | Urmanov | G06F 9/505 709/226 |
| 2014/0101306 | A1* | 4/2014 | Murgia | H04L 47/125 709/224 |
| 2014/0280325 | A1* | 9/2014 | Krishnamurthy | G06F 17/30516 707/770 |

OTHER PUBLICATIONS

PCT Written Opinion of the International Preliminary Examining Authority dated Feb. 11, 2016 for PCT Application No. PCT/US2015/018257, 9 pages.

"International Search Report and Written Opinion Issued in PCT Application No. PCT/US2015/018257", dated May 12, 2015, 11 Pages. (MS# 340995.02).

International Preliminary Report on Patentability dated May 17, 2016 for PCT application No. PCT/US2015/018257, 10 pages.

Mockapetris, P., "Domain Names—Implementation and Specification", Network Working Group, Request for Comments: 1035, Nov. 1983, pp. 1, 32, 39 and 40.

* cited by examiner

STREAMING QUERY RESOURCE CONTROL

BACKGROUND

Streaming queries comprise search criteria for ongoing retrieval of information from one or more streams of data such as news feeds, weather update data streams, flight data streams, financial markets data streams and other sources of continually updating information.

Existing streaming query platforms enable large scale queries to be managed on behalf of an entity such as an organization or corporation. The queries are large scale in that the amount of data to be retrieved using a query is relatively large. By using a streaming query platform the entity obtains the benefit of the ongoing search results without needing to provide resources (computing resources and communications resources) for ongoing execution of the query.

As demand for streaming queries increases there is a need to effectively and efficiently manage resources for operating those queries. The embodiments described below are not limited to implementations which solve any or all of the disadvantages of existing data centers and/or streaming query platforms.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Streaming query resource control is described, for example, to allocate streaming queries to servers in a data center providing a streaming query platform. In various embodiments streaming queries are allocated to servers in a manner seeking to balance load between the servers and also to reduce network traffic costs between data stream sources and the servers. In various examples, query types are taken into account, where a query type is the identity of one or more data stream sources used by the query, and optionally also traffic rates of the data stream sources. In some examples, processes for allocating incoming queries in an online fashion are described and in some examples, processes for allocating queries in an offline fashion are described. In examples, a network traffic cost metric is used which takes into account an incremental network traffic cost of adding a given query at a server.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
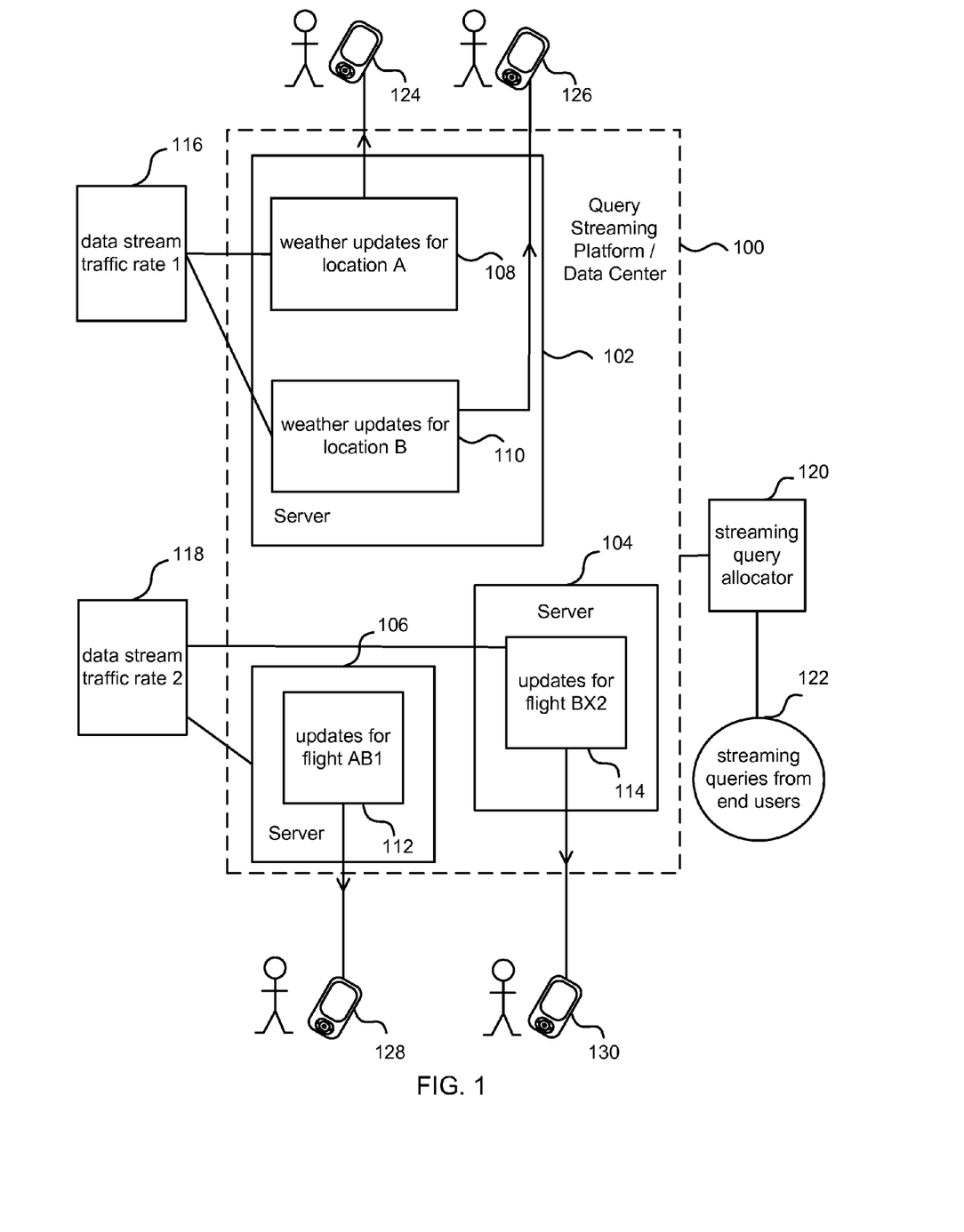
FIG. 1 is a schematic diagram of a data center at which streaming query operations execute.

FIG. 1 is a schematic diagram of a data center at which streaming query operations execute. A data center 100 comprises a plurality of computing entities such as servers 102, 104, 106, virtual machines or other computing devices. The data center 100 is in communication with a plurality of data streams 116, 118 over a communications network of any suitable type. The data streams 116, 118 (also referred to as sources) each have a traffic rate which is a rate at which data is output from or made available by the source. The traffic rate may vary over time. The computing entities within the data center may be in communication with one another although this is not essential.

Individual ones of the servers at the data center have capacity for executing one or more streaming queries. In the example of FIG. 1 server 102 comprises two streaming queries 108, 110; server 106 has one streaming query 112; and server 104 has one streaming query 114. This is an example only. Many more computing devices may be present at the data center 100 and individual computing devices may host large numbers of streaming queries where the traffic rates of the sources input to the streaming queries are relatively low (such as for weather update streams, flight update streams and other streams where updates occur at a relatively low frequency as compared with data updates that occur multiple times per second or minute.

An individual streaming query receives input from at least one data stream. In the example of FIG. 1 the illustrated streaming queries are single source streaming queries which receive input from only one data stream. However, a streaming query may receive input from two or more different data streams.

In the examples described herein the data center 100 is arranged as a query streaming platform. Computing entities at the data center are configured to enable a streaming query hosting service to be provided. End user equipment such as smart phones 124, 126, 128, 130, tablet computers, laptop computers, personal computers, or other end user equipment enables end users to input streaming queries. The streaming queries input by end users 122 are sent to the streaming query allocator 120, for example, by an intermediate system such as an information retrieval system. The streaming query allocator 120 allocates the streaming queries it receives to computing entities in the data center 100. The streaming query allocator 120 uses intelligent allocation processes in order to control which streaming queries are hosted at which computing entities. This enables improved data center control, for example, to balance workload between computing entities at the data center and/or more efficiently use data center resources. In addition, network traffic between the data streams and the data center is reduced. This saves communications bandwidth and also reduces the risk of packets of data being dropped so resulting in improved quality of streaming query output. Workload balancing and reduction of network traffic allows for deployment of a scalable platform and allows for timely processing of streaming queries.

The query execution service at the data center may run on top of a generic compute platform. For example, no efficient distribution system (such as multicasting) amongst the computing entities in the data center is available. Therefore when a server executes one or more queries that read from a particular source, then the platform creates an internal network stream to deliver the stream to that server, and consumes network resources proportional to the rate of the stream. A stream may be delivered at most once per computing entity at the data center.

In the example of FIG. 1 the streaming queries comprise requests for weather updates or flight updates for particular locations or flight numbers. These are examples only; other streaming queries may be used which search data from one or more data streams. The data streams 116, 118 may be any sources which make new data available to other computing entities at regular or irregular intervals. For example, news feeds, weather forecast feeds, traffic updates, share price streams and others.

A streaming query comprises software specifying one or more data streams and also comprising one or more rules or criteria to be applied to the data stream(s). For example, the streaming query may act as a filter which picks out data about a particular flight from a data stream comprising data about many flights. In another example, the streaming query may act as an aggregator and a filter. For example, to filter data from two sources and combine the results. These are examples of operations queries may comprise. Other examples are possible.

In various examples, individual streaming queries use relatively small amounts of computing resource of the data center 100 such that many thousands or millions of streaming queries may be hosted by the data center at any one time. Individual ones of the streaming queries have different life times. For example, a streaming query about a one off event has a short life time as compared with a streaming query about a daily recurring event. As time goes by, streaming queries hosted at the data center are executed, terminate and are deleted, and new streaming queries arrive for hosting. In a similar manner, data streams arrive, terminate, and change traffic rate. Computing entities within the data center 100 also experience malfunction and new computing entities are added or old ones removed. The streaming query allocator 120 has the challenge of dealing with one or more of these types of change. For example, the streaming query allocator 120 may seek to assign queries to servers in a semi-permanent manner. The allocator may seek to minimize moving queries between computing entities, for example to reduce overheads, as this requires moving query state while guaranteeing that the query does not miss any stream updates. Queries may be reassigned when their computing entity fails. The allocator aims to make a good decision about the assignment of a query to a server, when the query arrives. Churn both in queries (queries have limited lifetime) and in servers (due to server failures and re-cycles) is expected. The queries arrive and depart dynamically and the assignment of queries to servers by the allocator is robust to query and server dynamics.

The results of a streaming query may be sent to end user equipment, either directly from the data center 100 to the end user equipment or via another service. For example, the streaming query results may be returned to an information retrieval system which controls how the results are communicated to end user equipment. In some examples, a push notification system may be used to send a message to the end user equipment which results in a pop up display generated by an operating system at the end user equipment (for example, a "toast" message). In some examples, an email system may be used to email streaming query results to end user equipment. In some examples, a web socket may be used to send the streaming query results to the end user equipment, for example, to update a live "tile" at a graphical user interface display of the end user equipment.

By using the data center 100 to host streaming queries, processing burden is removed from end user equipment. In addition, network traffic efficiencies are achieved between the data streams and the computing entities executing the streaming queries.

Figure 2:
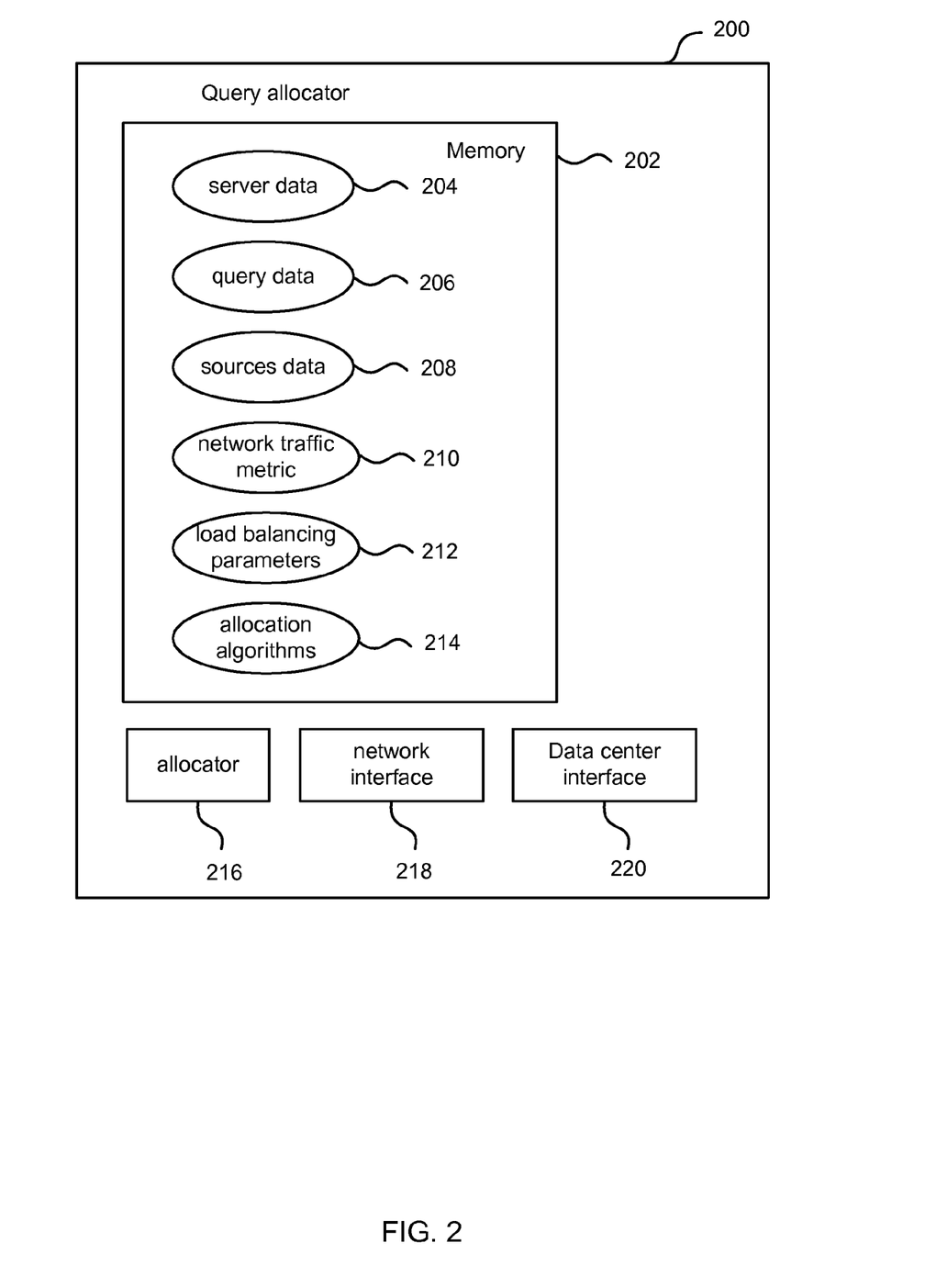
FIG. 2 is a schematic diagram of query allocator equipment of FIG. 1 in more detail.

FIG. 2 is a schematic diagram of query allocator equipment of FIG. 1 in more detail. The query allocator 200 is implemented using software and/or hardware. It comprises a network interface 218 for accessing data streams over a communications network. The network interface 218 also enables the query allocator to communicate with one or more computing systems from which streaming queries are received. For example, an information retrieval system. The network interface 218 may enable the query allocator to send results of streaming queries to end user equipment, either directly or via another computing service such as a push notification system or an information retrieval system.

The query allocator comprises a memory 202 storing at least: server data 204, query data 206, sources data 208, one or more network traffic metrics 210, load balancing parameters 212, allocation algorithms 214. The server data comprises at least information about how many computing entities are available at the data center and what available capacity those computing entities have. For example, the server data may comprise identities of the computing entities at the data center. The server data may also comprise maintained state information for individual ones of the computing entities at the data center. The maintained state information for a computing entity may comprise identities of any data streams input to the computing entity.

The query data may comprise, for an individual computing entity, information about which queries are active at the computing entity, a number of queries hosted at the computing entity, the types of query which are hosted at the computing entity, and optionally statistical information about queries.

A type of a query may be the identities of the data stream(s) used by the query and optionally also traffic rates of the data stream(s) used by the query.

The sources data 208 may comprise identities of sources available to the data center and traffic rates of the sources.

The network traffic metric 210 may be any rules, criteria, thresholds, or measures of network traffic between the data streams and the data center. A plurality of different network traffic metrics may be stored at memory 202 for use by allocator 216.

The load balancing parameters 212 are any values, or ranges of values, which may be used in conjunction with rules, thresholds, or criteria for assessing how evenly work load is spread throughout the servers in the data center.

The allocation algorithms 214 are a library of processes for use by allocator 216 when controlling allocation of queries amongst computing entities in the data center. Examples of allocation algorithms are described later in this document.

The query allocator 216 comprises software and/or hardware logic for executing allocation algorithms. A data center interface 220 is used to send instructions to install queries at allocated computing entities in the data center. The data center interface 220 also receives information about and/or monitors behavior in the data center. For example, to detect failure of a computing entity, to detect addition of a computing entity, to detect available capacity at computing entities.

Alternatively, or in addition, the functionality of the query allocator described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Various examples of operation of the query allocator of FIG. 2 are now described. In some examples the query allocator works in an offline mode in which a batch or store of queries are available to be allocated. In some examples the query allocator works in an online mode in which a stream of queries arrives and individual ones of the queries from the stream are allocated in turn, without knowledge of which queries will arrive later. The query allocator may switch between online and offline modes as described in more detail later.

Figure 3:
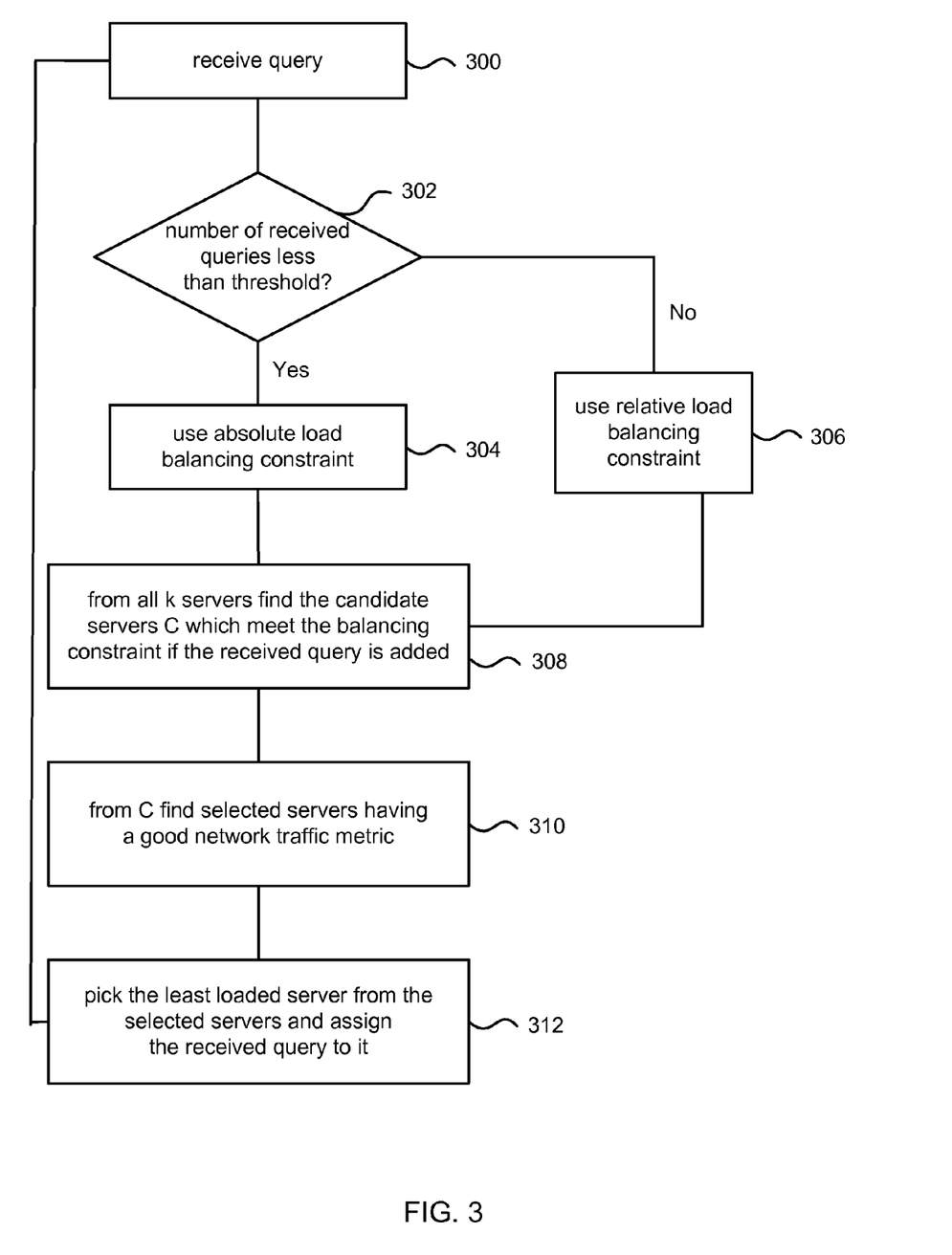
FIG. 3 is a flow diagram of a method of operation at the query allocator of FIG. 2 in an online mode.

FIG. 3 is a flow diagram of a method of operation at the query allocator of FIG. 2 in an online mode. During the online mode queries are received at the query allocator and are allocated in a greedy process to one of the servers in the data center. A greedy process is one whereby the allocation takes into account the current situation but not future situations, so that once a query is allocated to a server it remains at that server during the greedy process.

A query is received 300 at the query allocator. An optional check 302 is made as to whether the data center query platform is in an initial phase or not. During the initial phase, few queries are installed at the data center and available capacity at the servers is high. The optional check 302 may comprise monitoring the cumulative number of queries received and comparing the monitored number with a threshold. If the optional check 302 indicates that the query platform is in an initial phase, the query allocator proceeds to use an absolute load balancing constraint 304. For example, an absolute load balancing constraint may be a specified capacity (which may be the same at each server) which may be used for queries; queries may be allocated to the server until the specified capacity is met. For example, incoming queries may be allocated to the same server for a period of time until that server reaches the absolute load balancing constraint. For example, this enables one server to be filled with queries before moving to the next server and so on. For example, the load balancing metric may be switched between an absolute and a relative load balancing metric according to data about the state of the data center.

If the optional check 302 indicates that the query platform is not in an initial phase, the query allocator proceeds to use a relative load balancing constraint 306. A relative load balancing constraint is one which takes into account current capacity at more than one of the servers. For example, a relative load balancing constraint may select one of the servers with the most capacity, or with capacity above at least one other server.

Once a load balancing constraint is selected (either absolute or relative) the query allocator proceeds to use a greedy allocation process as indicated in steps 308, 310, 312. The method of FIG. 3 may then repeat as subsequent queries arrive.

The query allocator finds, from the available servers k, the candidate servers C which meet the balancing constraint (absolute or relative according to the earlier steps of the method) if the received query were to be added to those servers. This is achieved by calculating an updated capacity at available servers and making comparisons on the basis of the load balancing constraint.

The query allocator selects 310 servers from the candidate servers on the basis of a network traffic metric. The network traffic metric is a measure of network traffic cost for sending data streams needed for the queries to the servers. If there is more than one selected server the query allocator proceeds to step 312. Step 312 comprises picking the least-loaded server from the selected servers and assigning the received query to it. The assignment process comprises sending control messages or other instructions to the selected server which triggers that server to install the received query. If only one server is selected from the candidate servers then step 312 may be omitted.

Various different network traffic metrics may be used. For example, a network traffic metric may take into account query type where the type of a query is an identifier of one or more data sources used by the query. The type of a query may also comprise traffic rate information of data sources used by the query.

In some examples the method of FIG. 3 uses a least incremental cost metric for the network traffic metric. This metric measures the change in traffic cost at a given server as a result of a proposed addition of the incoming query to that server. The metric is calculated for different ones of the servers at the data center and the results compared to select one of the servers. For example, the server with the smallest change in traffic cost is selected.

In some examples the method of FIG. 3 uses a least source cost metric for the network traffic metric. This metric measures the new total traffic cost at a given server in the case that the proposed incoming query is installed at the given server. This metric is calculated for different ones of the servers at the data center and the results compared to select one of the servers.

In some examples the method of FIG. 3 uses a least query type metric for the network traffic metric. This metric measures the similarity of query types at a server in the case that the proposed incoming query is installed at the given server. This metric is calculated for different ones of the servers at the data center and the results compared to select one of the servers.

The processes described above with respect to FIG. 3 have been found empirically to give good results which perform better than a random allocation of queries to servers. In addition, the least incremental cost metric has been found to give particularly good results and to perform well under a wide range of scenarios, including query and server churn.

Figure 4:
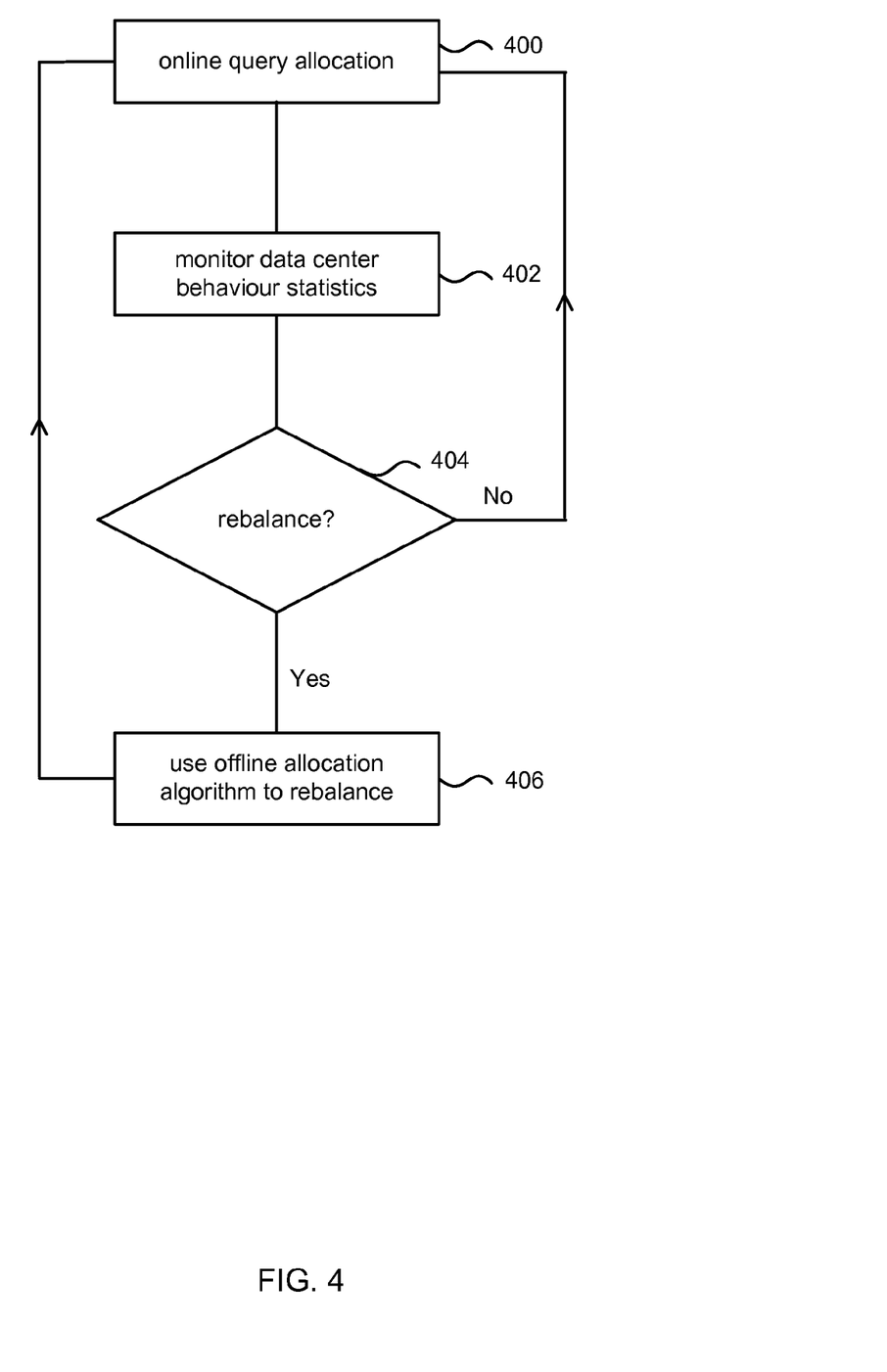
FIG. 4 is a flow diagram of another method of operation at the query allocator of FIG. 2 for selecting between online and offline modes.

As mentioned above FIG. 3 is concerned with greedy allocation process during online modes. Where greedy allocation is used servers in the data center may become unbalanced or non-optimally arranged with regard to query allocation. This is because the greedy allocation process, by its nature, does not take into account future scenarios. For example, queries of the same type may become dispersed through the data center rather than concentrated at one server, so pushing up network traffic costs. To reduce the risk of these types of imbalance in the data center, offline query allocation may be interleaved with online query allocation, at regular or irregular intervals. This is now described with reference to FIG. 4. In an offline query allocation situation, the query allocator has knowledge of a plurality of queries to be allocated and is able to allocate on the basis of that knowledge.

Where online query allocation is in progress 400 the query allocator may monitor 402 data center behavior statistics. For example the query allocator may monitor network traffic levels, server loads and other data. If the query allocator detects the need for rebalance 404 it moves to an offline allocation algorithm 406. During offline allocation the existing queries installed at the data center may be moved to different servers in order to obtain a better arrangement in terms of both load balancing and network traffic cost. Once the offline allocation is complete the query allocator may return to online query allocation mode 406. The query allocator may use rules, criteria, thresholds or other data together with the monitored statistics when making the rebalancing decision at step 404. However, it is also possible to omit steps 402 and 404 by configuring the query allocator to carry out offline allocation at specified times, or at specified intervals.

In some examples, offline query allocation is used to reserve capacity at servers in the data center. The reserved capacity may then be used for online allocation. For example, with reference to FIG. 5, the query allocator may be arranged to predict 500 incoming query types and frequency over a specified time period. The prediction may be made using historical data about queries incoming to the query allocator. The query allocator uses the predicted data to reserve 502 query allocations at servers of the data center. During an online mode the query allocator receives 504 queries to be allocated and it allocates 506 the received queries to the reserved capacity at the servers. For example, the reserved capacity at server A may comprise slots for 50 queries of type X and 10 slots for queries of type Y. The query allocator fills the reserved slots according to the query types of the incoming queries. The reserved slots may also be prioritized during the offline allocation process so that the query allocator is able to fill the slots according to that priority. In this way the benefits of offline query allocation may be obtained during online allocation where good predictions of incoming queries are possible. This reduces network traffic and increases working capacity of the data center.

Figure 5:
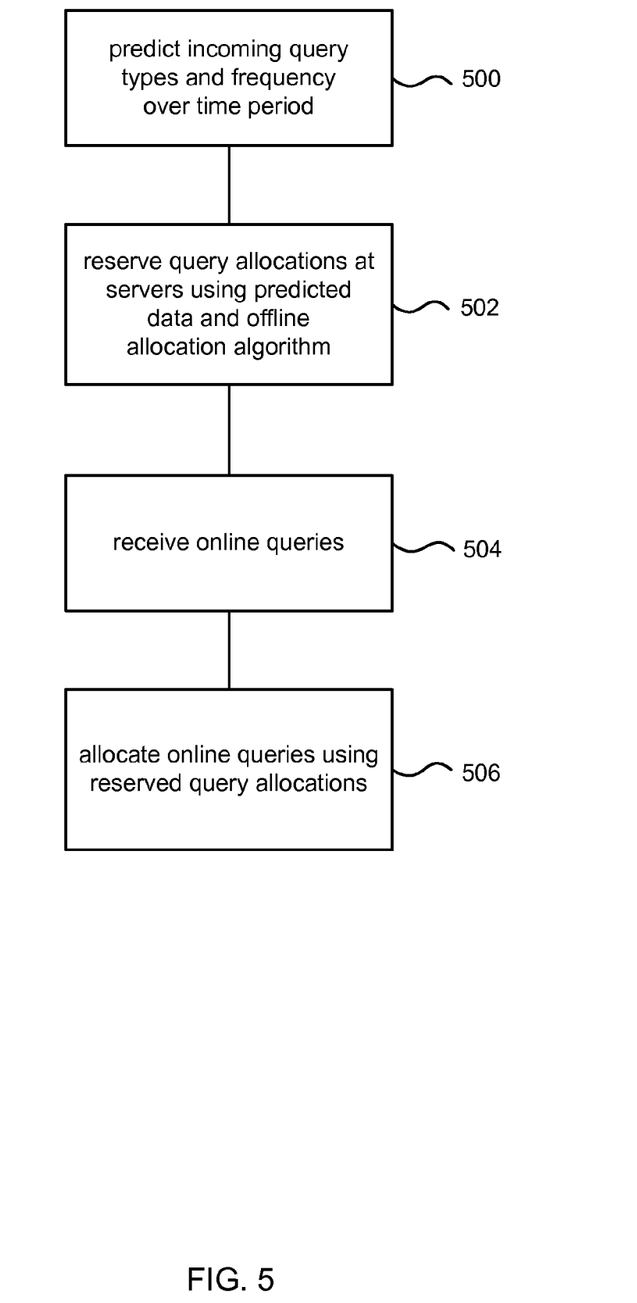
FIG. 5 is a flow diagram of a method of using reservations, which may be carried out at the query allocator in an online mode.

Various different offline allocation processes may be used by the query allocator in the methods of FIGS. 4 and 5 or other offline allocation methods. Examples of offline allocation processes which may be used are now given with reference to FIGS. 6 to 8.

Figure 6:
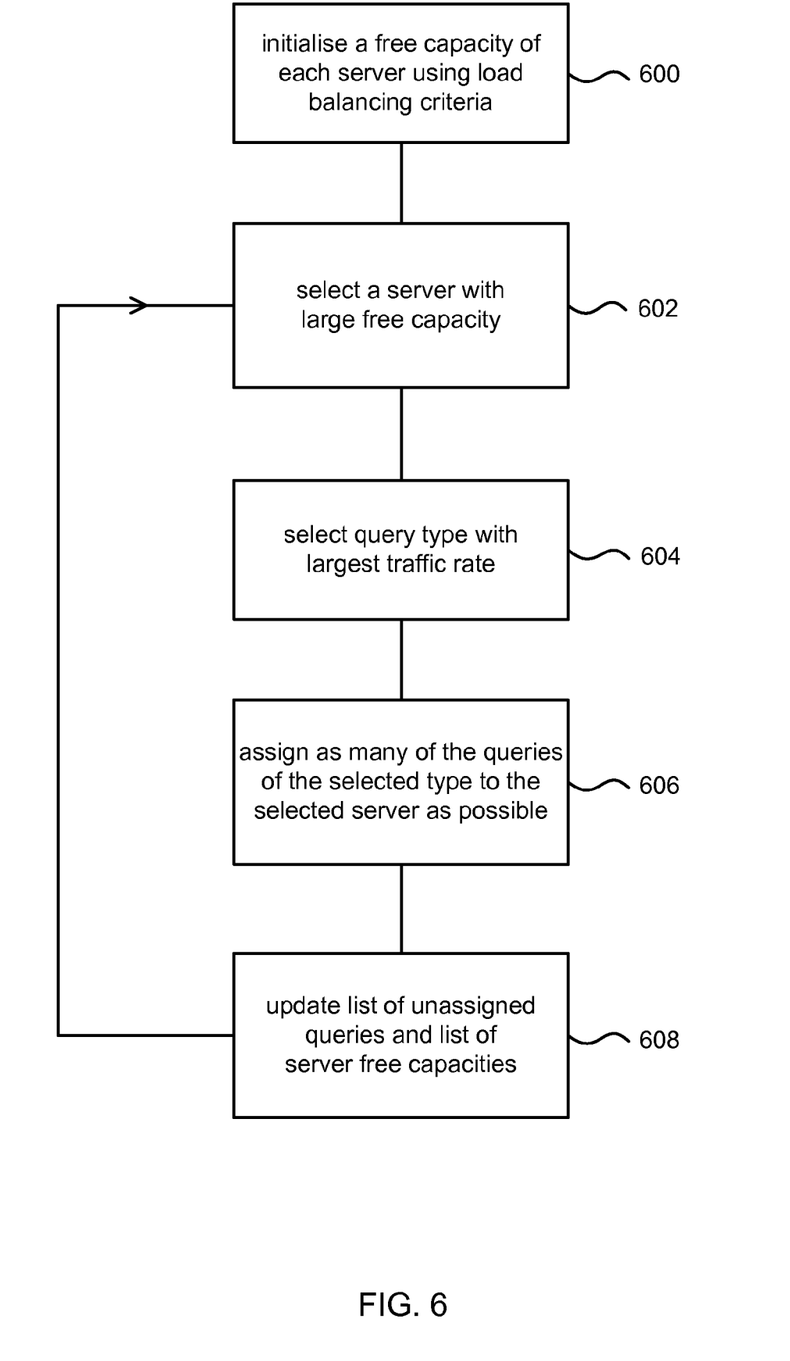
FIG. 6 is a flow diagram of a method of operation at the query allocator for offline mode with queries having single sources.

FIG. 6 is a flow diagram of an offline allocation process in the single source case, where a single query takes input from a single source. The process of FIG. 6 may be implemented at the query allocator of FIG. 1. The query allocator sends control messages to the servers in the data center instructing the servers to initialize 600 a specified amount of capacity for use by the query allocation service. For example, the specified amount of capacity is calculated by the query allocator using an absolute load balancing criterion as mentioned above. The query allocator has knowledge of a pool of queries to be allocated in the offline process and may use information about the pool of queries when making the initialization instructions. The specified amount of capacity may also be preconfigured or calculated in other ways.

The query allocator selects 602 a server of the data center, for example, on the basis of initialized server capacity. The query allocator selects a query type 604 from the possible types of query which are in the pool of queries to be allocated. For example, the query allocator may select the most frequently occurring query type in the query pool, and/or may select the query type with the largest traffic rate 604. That is, selection of query type may be on the basis of query type frequency and/or query type traffic rate. Other criteria for selecting the query type may be used.

The query allocator assigns as many of the queries of the selected type to the selected server as possible 606. The query allocator then updates the query pool and server capacity data. The process then repeats from step 602 by selecting a server with free initialized capacity.

Figure 7:
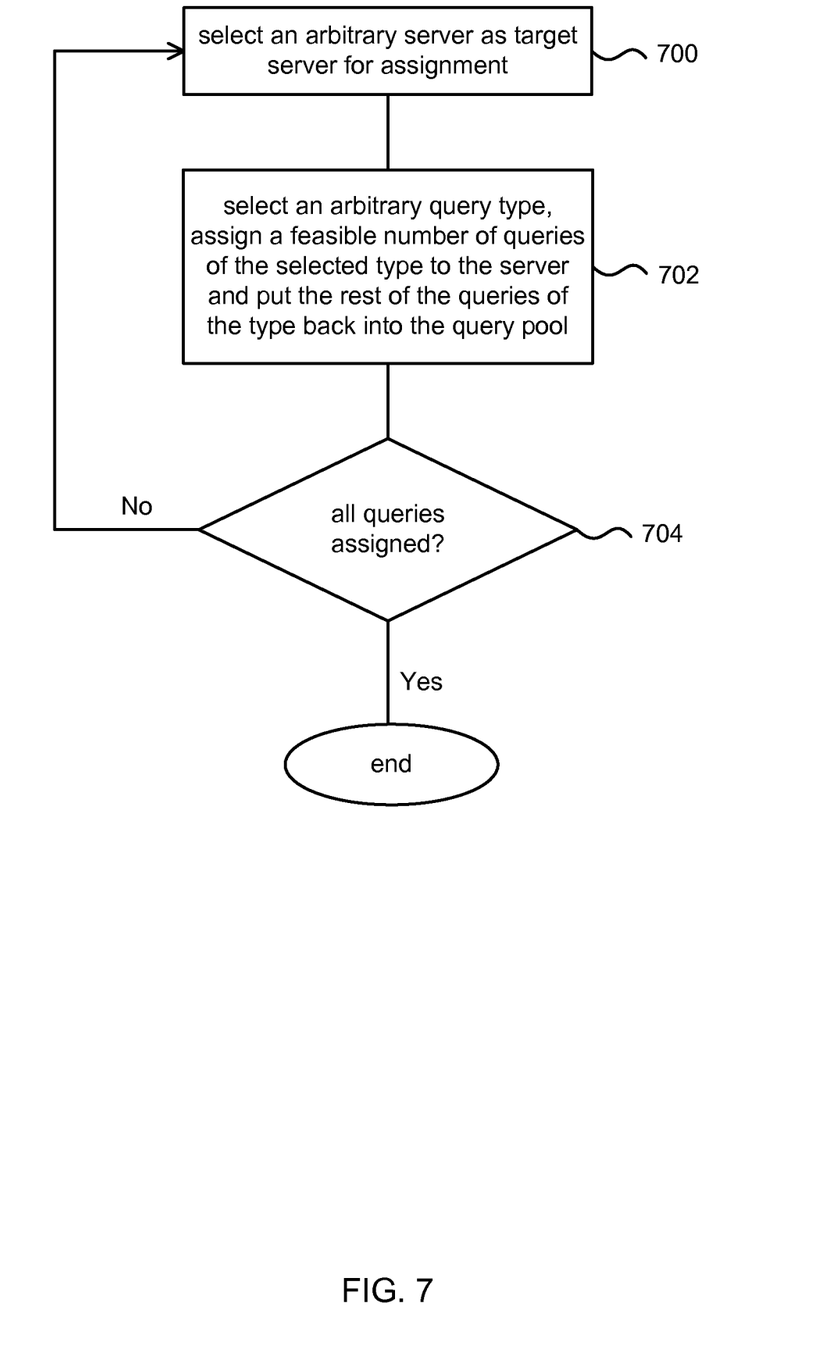
FIG. 7 is a flow diagram of a method of operation at the query allocator for offline mode with queries having multiple sources.

FIG. 7 is an example of a method at the query allocator for offline query allocation in a multi-source situation, where a query may take input from two or more sources. In this example, the query allocator selects 700 an arbitrary server as a target server for assignment. The query allocator selects 702 an arbitrary query type from the available query types in the pool of queries. The query allocator assigns a feasible number of queries of the selected type to the selected server. It puts the rest of the queries of the selected type back into the query pool. The query allocator checks if all the queries from the pool have been allocated 704. If so the process ends; otherwise the process repeats from step 700.

Figure 8:
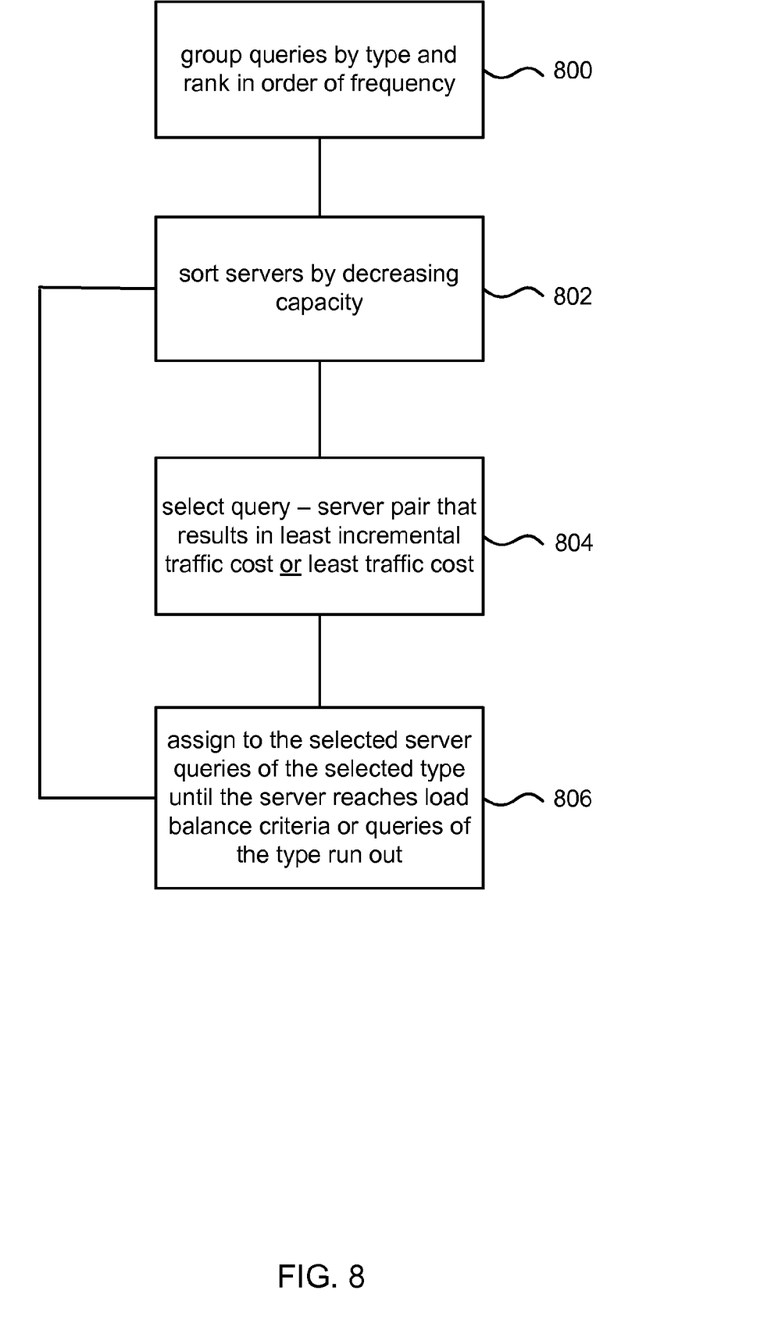
FIG. 8 is a flow diagram of a method of operation at the query allocator for offline mode with queries having multiple sources

FIG. 8 is another example of a method at the query allocator for offline query allocation in a multi-source situation. Queries in the query pool are grouped 800 by type and the groups are ranked in order of frequency (that is, number of queries in each group). The servers are sorted by decreasing capacity 802. The query allocator selects 804 a query-server pair that results in a least incremental traffic cost, or a least traffic cost. The query allocator assigns 806 to the selected server queries of the selected type until the server reaches a load balance criterion, or until queries of the selected type run out. The process repeats from step 802.

Figure 9:
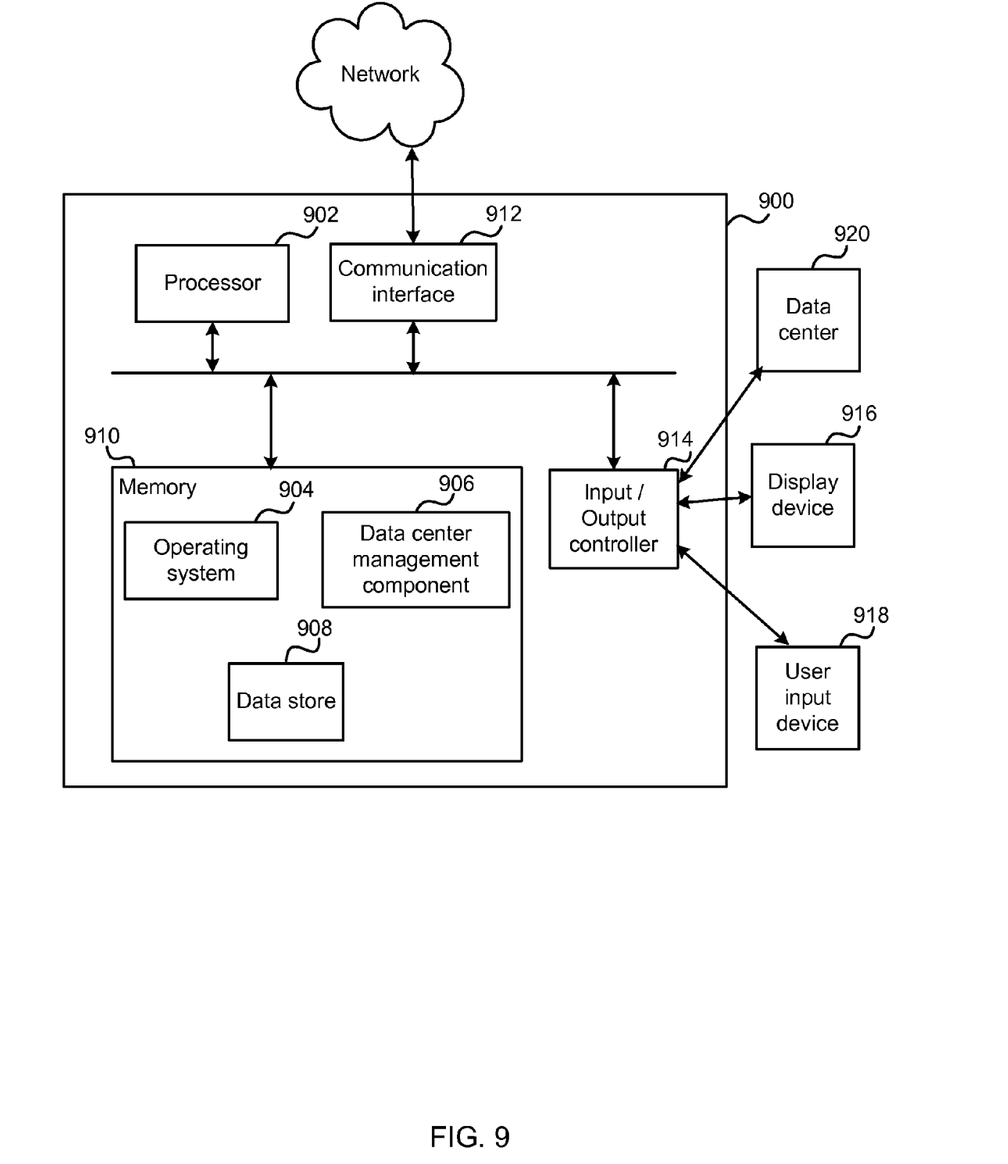
FIG. 9 illustrates an exemplary computing-based device in which embodiments of streaming query allocator equipment for data center control may be implemented.

FIG. 9 illustrates various components of an exemplary computing-based device 900 which may be implemented as any form of a computing and/or electronic device, and in which embodiments of a data center query allocator may be implemented.

Computing-based device 900 comprises one or more processors 902 which may be microprocessors, controllers or any other suitable type of processors for processing computer executable instructions to control the operation of the device in order to control allocation of queries to servers of a data center in an offline or an online mode. In some examples, for example where a system on a chip architecture is used, the processors 902 may include one or more fixed function blocks (also referred to as accelerators) which implement a part of the method of allocating queries to servers in hardware (rather than software or firmware). Platform software comprising an operating system 904 or any other suitable platform software may be provided at the computing-based device to enable application software to be executed on the device. For example, data center management component 906 comprises a query allocator as described herein to enable computing resources of a data center to be controlled. A data store 908 at memory 910 may store allocation algorithms, data monitored from a data center, data source information, criteria, thresholds, rules and other data.

The computer executable instructions may be provided using any computer-readable media that is accessible by computing based device 900. Computer-readable media may include, for example, computer storage media such as memory 910 and communications media. Computer storage media, such as memory 910, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 910) is shown within the computing-based device 900 it will be appreciated that the storage may be distributed or located remotely and accessed via a network or other communication link (e.g. using communication interface 912). Communication interface 912 enables the computing-based device 900 to communicate with data sources such as data streams which are available over a communications network. Communication interface 912 also enables the computing-based device 900 to receive queries from end user equipment either directly or via intermediate systems and to send outputs of the query executions to those entities.

The computing-based device 900 also comprises an input/output controller 914 arranged to interface to a data center 920, for example, to send control messages to servers of the data center and/or to monitor behavior in the data center such as traffic rates, server load, error detection, query churn and others.

The input/output controller 914 may output display information to a display device 916 which may be separate from or integral to the computing-based device 900. The display information may provide a graphical user interface, for example, to enable a human operator to view management data about the data center and query service. The input/output controller 914 may be arranged to receive and process input from one or more devices, such as a user input device 918 (e.g. a mouse, keyboard, camera, microphone or other sensor). In some examples the user input device 918 may detect voice input, user gestures or other user actions and may provide a natural user interface (NUI). This user input may be used to view management data about the data center, select query allocation algorithms, select between online and offline modes and others. In an embodiment the display device 916 may also act as the user input device 918 if it is a touch sensitive display device. The input/output controller 914 may also output data to devices other than the display device, e.g. a locally connected printing device.

Any of the input/output controller 914, display device 916 and the user input device 918 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
   receiving, at a processor, a plurality of queries, wherein individual queries of the plurality of queries are associated with respective data stream sources and comprise processor-executable instructions to read from the associated data stream sources;
   selecting a first computing entity of a plurality of computing entities on the basis of both:
      a first measure of load balancing between the plurality of computing entities; and
      a second measure of communications traffic cost between the data stream source associated with a first query of the plurality of queries and the first computing entity;
   sending first control instructions to the first computing entity to trigger the first computing entity to install the first query;
   selecting a second computing entity of a plurality of computing entities on the basis of both:
      a third measure of load balancing between the plurality of computing entities; and
      a fourth measure of communications traffic cost between the data stream source associated with a second query of the plurality of queries and the second computing entity;
   sending second control instructions to the second computing entity to trigger the second computing entity to install the second query;
   after sending the first control instructions to the first computing entity and sending the second control instructions to the second computing entity, rebalancing the first query and the second query, and allocating a third query of the plurality of queries, by selecting a third computing entity, a fourth computing entity, and a fifth computing entity of the computing entities on the basis of both:
      a fifth measure indicating load balancing between the third computing entity, the fourth computing entity, and the fifth computing entity with respect to the first query, the second query, and the third query; and
      a sixth measure indicating a communications traffic cost between:
         at least one of the third computing entity, the fourth computing entity, and the fifth computing entity; and
         at least one data stream source associated with at least one of the first query, the second query, or the third query;
   sending control instructions to the first computing entity to trigger the first computing entity to move the first query off the first computing entity;
   sending control instructions to the second computing entity to trigger the second computing entity to move the second query off the second computing entity;
   sending control instructions to the third computing entity to trigger the third computing entity to install the first query;
   sending control instructions to the fourth computing entity to trigger the fourth computing entity to install the second query; and
   sending control instructions to the fifth computing entity to trigger the fifth computing entity to install the third query.

2. The method of claim 1, wherein at least one of the first measure, the third measure, or the fifth measure comprises a predetermined capacity associated with an individual computing entity of the plurality of computing entities.

3. The method of claim 1, further comprising determining at least one of the first measure, the third measure, or the fifth measure based at least in part on respective capacities of multiple, different computing entities of the plurality of computing entities.

4. The method of claim 1, further comprising:
   receiving data indicating a state of a data center comprising the plurality of computing entities; and based at least in part on the data, determining at least one of the first measure, the third measure, or the fifth measure based at least in part on either:
  a predetermined capacity associated with an individual computing entity of the plurality of computing entities; or
  respective capacities of multiple, different computing entities of the plurality of computing entities.

5. The method of claim 1, further comprising determining at least one of the second measure, the fourth measure, or the sixth measure based at least in part on a change in traffic cost at one of the computing entities as a result of a proposed addition of a respective query to that computing entity.

6. The method of claim 1, further comprising determining at least one of the second measure, the fourth measure, or the sixth measure based at least in part on a new total traffic cost at one of the computing entities in the case that the received query is installed at that computing entity.

7. The method of claim 1, further comprising determining at least one of the second measure, the fourth measure, or the sixth measure based at least in part on a similarity of query types at one of the computing entities in the case that the received query is installed at that computing entity.

8. The method of claim 1, further comprising selecting the third computing entity, the fourth computing entity, and the fifth computing entity further based at least in part on data about the plurality of queries.

9. The method of claim 8, further comprising:
  selecting a query type on the basis of respective traffic rates of queries of the plurality of queries;
  selecting a sixth computing entity of the plurality of computing entities; and
  sending control instructions to the sixth computing entity to trigger the sixth computing entity to install queries of the selected query type from the plurality of queries.

10. The method of claim 8, further comprising:
  selecting a query type;
  selecting a sixth computing entity of the plurality of computing entities; and
  sending control instructions to the sixth computing entity to trigger the sixth computing entity to install a specified number of queries of the selected query type from the plurality of queries.

11. The method of claim 8, further comprising grouping the plurality of queries by query type, wherein a query type of a query is associated with an identity of one or more data streams used by that query;
  selecting a sixth computing entity in conjunction with selecting one of the query types; and
  sending control instructions to the second computing entity to trigger the sixth computing entity to install queries of the selected query type.

12. The method of claim 8, wherein the plurality of queries comprises queries predicted to be received over a specified time interval.

13. The method of claim 12, further comprising sending control instructions to one or more computing entities of the plurality of computing entities to trigger the one or more computing entities to reserve resources for queries.

14. A computer-implemented method comprising:
  receiving, at a processor, a first query comprising computer-executable instructions to receive data from at least one data stream source;
  selecting a first computing entity of a plurality of computing entities on the basis of both:
    a measure of load balancing between a plurality of computing entities; and
    a measure of communications traffic cost between the at least one data stream source and the selected computing entity; wherein the measure of communications traffic cost measures the change in traffic cost at one of the computing entities as a result of a proposed addition of the first query to that computing entity;
  sending control instructions to the first computing entity to trigger the computing entity to install the first query;
  receiving, at the processor, a second query;
  rebalancing the first query and the second query among the plurality of computing entities by determining a second computing entity different from the first computing entity based at least in part on both:
    a second measure of load-balancing between the plurality of computing entities; and
    respective measures of communications traffic cost indicating the change in traffic cost at respective ones of the computing entities as a result of proposed additions of respective ones of the first query and the second query to the respective computing entities; and
  sending control instructions to the second computing entity to trigger the second computing entity to install the first query.

15. The method of claim 14, further comprising rebalancing the first query and the second query further based on respective query types of the first query and the second query.

16. The method of claim 14, further comprising sending control instructions to one or more computing entities of the plurality of computing entities to trigger the one or more computing entities to reserve resources for queries.

17. A data center management component comprising:
  a processor arranged to receive queries comprising computer-executable instructions to receive data from respective data stream sources, the queries comprising a first query and a second query;
  an interface arranged to send control instructions to respective computing entities of a plurality of computing entities to trigger the respective computing entities to install respective ones of the queries; and
  a query allocator executable on the processor to perform operations comprising:
    selecting a first computing entity of the plurality of computing entities on the basis of both:
      a measure of load balancing between the plurality of computing entities; and
      a measure of communications traffic cost between ones of the data stream sources and ones of the computing entities; and
    causing the interface to send first control instructions to the first computing entity to trigger the first computing entity to install the first query;
    subsequently, rebalancing the first query and the second query by selecting a third computing entity and a fourth computing entity of the plurality of computing entities on the basis of both:
      a measure of load balancing between the plurality of computing entities with respect to multiple ones of the queries including at least the first query and the second query; and
      a measure of communications traffic cost between ones of the data stream sources and ones of the computing entities; and
    after causing the interface to send the first control instructions, causing the interface to:

send second control instructions to the first computing entity to trigger the first computing entity to move the first query off the first computing entity;

send third control instructions to the third computing entity to trigger the third computing entity to install the first query, wherein the third computing entity is different from the first computing entity; and send fourth control instructions to the fourth computing entity to trigger the fourth computing entity to install the second query.

18. The data center management component of claim 17, the interface further arranged to receive data about the state of the data center.

19. The data center management component of claim 17, wherein the measure of communications traffic cost measures the change in traffic cost at one of the computing entities as a result of a proposed addition of the received query to that computing entity.

20. The data center management component as claimed in claim 17, further comprising hardware logic selected from any one or more of: a field-programmable gate array, a program-specific integrated circuit, a program-specific standard product, a system-on-a-chip, a complex programmable logic device, or a graphics processing unit, wherein the query allocator is at least partially implemented using the hardware logic.

* * * * *